(12) United States Patent
Rankin

(10) Patent No.: US 6,752,033 B2
(45) Date of Patent: Jun. 22, 2004

(54) TELESCOPING GEARBOX COUNTERSHAFT DECOUPLER

(76) Inventor: Charles G. Rankin, P.O. Box 716, Smithville, MO (US) 64089-0716

( * ) Notice: Subject to any disclaimer, the term of this patent is extended or adjusted under 35 U.S.C. 154(b) by 35 days.

(21) Appl. No.: 10/262,350

(22) Filed: Sep. 30, 2002

(65) Prior Publication Data

US 2004/0060377 A1 Apr. 1, 2004

(51) Int. Cl.$^7$ .............................................. F16H 3/091
(52) U.S. Cl. ........................................................ 74/329
(58) Field of Search .......................... 74/329, 325, 333, 74/374, 375

(56) References Cited

U.S. PATENT DOCUMENTS

| | | |
|---|---|---|
| 1,225,851 A | 5/1917 | Phillips et al. |
| 2,001,141 A | 5/1935 | Kittilsen |
| 2,009,133 A | 7/1935 | Gerst |
| 2,021,165 A | 11/1935 | Barton |
| 2,106,841 A | 2/1938 | Griswold |
| 2,117,654 A | 5/1938 | Cotanch |
| 4,464,947 A | 8/1984 | Windsor-Smith et al. |
| 4,483,210 A | 11/1984 | Mayuzumi |
| 4,565,106 A | 1/1986 | Sumiyoshi |
| 4,566,348 A | 1/1986 | Akashi |
| 4,579,015 A | 4/1986 | Fukui |
| 4,597,304 A | 7/1986 | Cataldo |
| 4,882,951 A | 11/1989 | Braun |
| 4,960,005 A | 10/1990 | Kashiwase |
| 5,044,215 A | 9/1991 | Watanabe |
| 5,381,703 A | 1/1995 | Rankin |
| 6,202,499 B1 | 3/2001 | Brinn |

FOREIGN PATENT DOCUMENTS

JP     08338483 A  * 12/1996

OTHER PUBLICATIONS

*How Thinks Work*, vol. II, published by Edito–Service, S.A., pp. 214–219.
*The New Illustrated Science and Invention Encyclopedia*, vol. 20, published by H.S. Stuttman, Inc. copyright Marshall Cavendish Limited 1987, 1989, pp. 2710–2711.

* cited by examiner

*Primary Examiner*—Ankur Parekh
(74) *Attorney, Agent, or Firm*—Hovey Williams LLP

(57) ABSTRACT

When in a change speed mode, the transmission has an input shaft that provides driving power to an axially aligned but separately rotatable output shaft through a countershaft assembly situated alongside the input shaft and containing a series of change speed gears. A special slider assembly located on the input shaft and the output shaft between the input and output gears is in meshing engagement with the output gear at this time to operably connect the output gear with the output shaft. When the slider assembly is shifted to its fully forward direct drive mode, however, the countershaft assembly is decoupled from the input shaft and the slider assembly serves to directly couple the input shaft with the output shaft. The slider assembly is comprised of two relatively rotatably parts, one comprising a slider sleeve that meshes with the output gear when the slider assembly is in its changed speed position and the other comprising a slider collar circumscribing the sleeve that is telescopically received within a socket in the hollow input gear. When the slider assembly is in its direct drive position, the slider collar is fully received within the profile of the input gear and thereby adds no additional length to the transmission.

20 Claims, 4 Drawing Sheets

TELESCOPING GEARBOX COUNTERSHAFT DECOUPLER

TECHNICAL FIELD

The present invention relates to automotive gearboxes and, more particularly, to a gearbox having an improved way of operably decoupling a countershaft assembly from the gearbox input shaft when the gearbox is placed in a direct drive mode.

BACKGROUND AND SUMMARY

My earlier U.S. Pat. No. 5,381,703 titled "Gearbox Countershaft Decoupler" discloses an energy and performance saving alternative to conventional manual gearboxes by providing a way of operatively decoupling a countershaft assembly provided with change speed gears from the input shaft of the gearbox when the gearbox is operating in a direct drive mode. Because the countershaft assembly with its change speed gears is typically immersed in relatively viscus lubricant within the gearbox, a substantial amount of energy is consumed just in turning the countershaft and gears of the countershaft assembly. In my prior patent, therefore, when the gearbox is in the direct drive mode in which the input shaft is coupled directly to the output shaft without transferring power through the decoupled countershaft assembly, a substantial energy savings is obtained because the countershaft assembly does not turn. In the interest of completeness, my prior U.S. Pat. No. 5,381,703 is hereby incorporated by reference into the present specification.

While the decoupling arrangement of the '703 patent has proven to be highly effective and successful in producing energy and performance savings, my prior arrangement has certain drawbacks with respect to space requirements and the need for additional shifting mechanisms. In this respect, it was found that original equipment gearbox housings could not be retrofitted with my prior mechanism because of an increased overall length of the mechanism. Furthermore, an additional shifting mechanism such as a fork, hydraulic clutch, or the like needed to be added to the overall mechanism, adding complexity and cost.

In accordance with my present invention, a manual transmission or gearbox that provides decoupling of the countershaft assembly in the direct drive mode can be retrofitted to existing transmissions and uses no extra room within the transmission casing or housing and requires no additional shift mechanisms. Furthermore, a transmission in accordance with the present invention does not lose any surface area contact between gears of the transmission and thus will not suffer in terms of strength and reliability over conventional arrangements. Additionally, the principles of the present invention can be applied to transmissions having many different change speed gears, can be utilized in synchromesh transmissions, and can also be utilized in connection with an auxiliary gearbox at the rear end of the drive train of a vehicle in association with a high/low speed gearbox.

In a preferred embodiment of the invention, the gearbox includes a shaft assembly comprising an input shaft and an output shaft in axial alignment with the input shaft. An input gear on the input shaft transfers driving power to a countershaft assembly in all modes other than the direct drive mode, and the countershaft assembly in turn drives an output gear that becomes drivingly coupled with the output shaft when a special two-part slider assembly on the shaft assembly, comprising a slider sleeve and a slider collar rotatably encircling the sleeve, is in a change speed position. On the other hand, when the slider assembly is in a direct drive position, the input gear is effectively decoupled from the input shaft and the slider assembly serves as the means by which driving power is transferred directly from the input shaft to the output shaft, completely bypassing the countershaft assembly and the output gear.

The input gear is hollow, presenting a recess or socket that faces the slider assembly and serves to telescopically receive the collar of the slider assembly. Thus, in the direct drive mode the collar is fully housed within the input gear and takes up no more of the axial length of the shaft assembly than the input gear itself. External teeth on the slider collar are in constant meshing engagement with internal teeth on the socket of the input gear, but internal teeth on the slider collar are received within an annular void on the input shaft when the slider assembly is in the direct drive position so as to avoid operative engagement between the slider collar and the input shaft at that time. Although this decouples the input gear from the input shaft, teeth on the sleeve part of the slider assembly mesh with a set of strategically located teeth on the input shaft at this time so that the slider sleeve receives driving input from the input shaft. That input power is then transferred directly by the slider sleeve to the output shaft through intermeshing teeth on the slider sleeve and the output shaft.

The slider sleeve is retained within the outer slider collar by releasable detent structure that also permits relative rotation between those two parts. Thus, they are releasably held together for conjoint movement along the shaft assembly when a shifter fork attached to the slider sleeve shifts the slider assembly between the direct drive position and a neutral position. However, the detent structure releases the slider sleeve when the fork shifts the sleeve to a further, change speed position in driving engagement with an output gear, leaving the slider collar behind in the input gear. The detent structure readily recouples the two parts of the slider assembly back together when the sleeve is pushed back into the collar to re-establish the neutral position or the direct drive position. Special yieldable stop structure on the input gear and the slider collar keeps the collar from being pulled completely out of the input gear when the slider sleeve is shifted into its change speed position from the neutral position.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

In addition to U.S. Pat. No. 5,381,703, the inventor also incorporates by reference into the present specification page 214 through 219 of Volume II of *How Things Work* published by Edito-Service, S.A., and pages 2710 and 2711 from Volume 20 of *The New Illustrated Science and Invention Encyclopedia*, published by H. S. Stuttman, Inc., copyright Marshall Cavendish Limited 1987, 1989.

Figure 1:
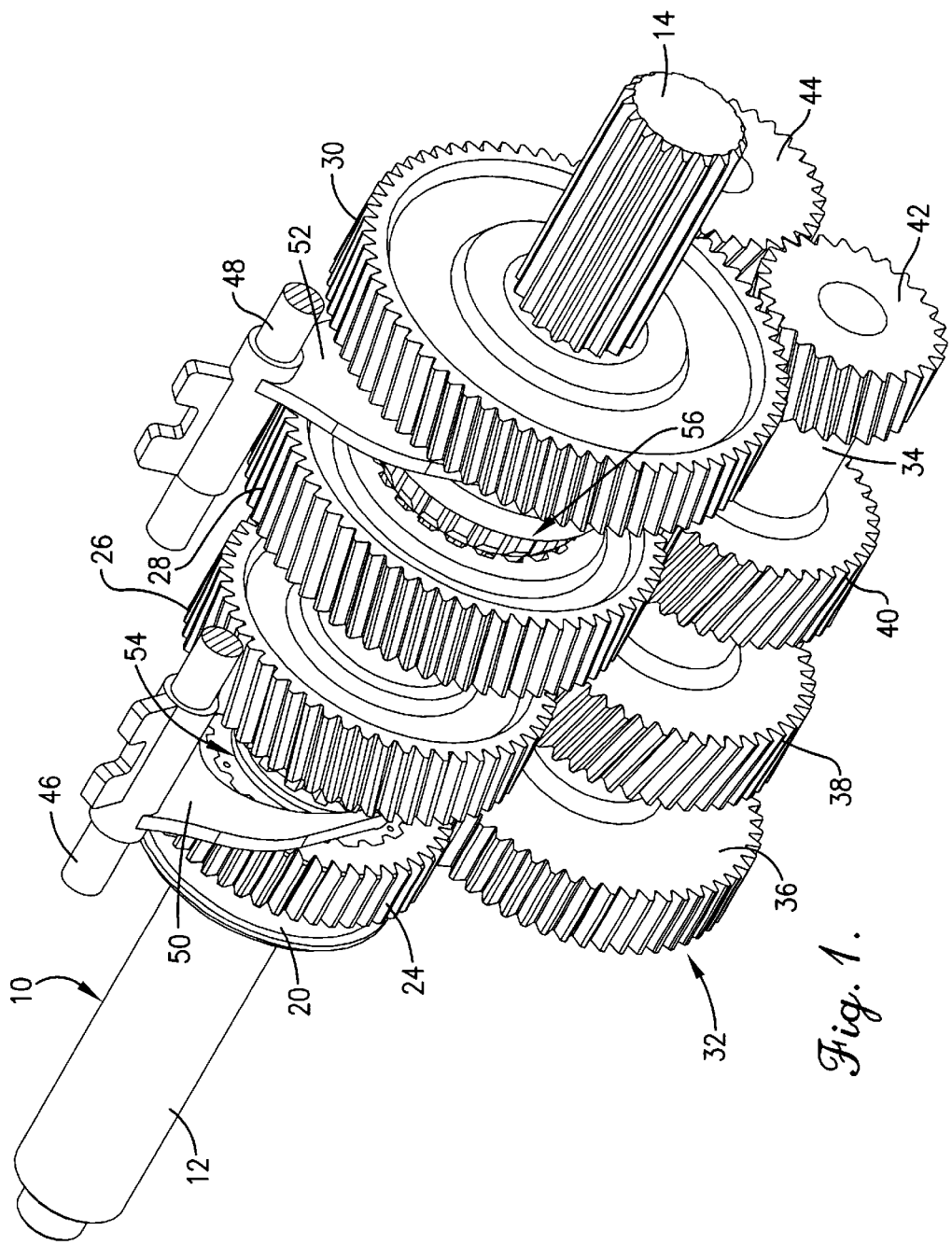
FIG. 1 is a fragmentary, rear perspective view of a gearbox transmission constructed in accordance with the principles of the present invention.
Figure 2:
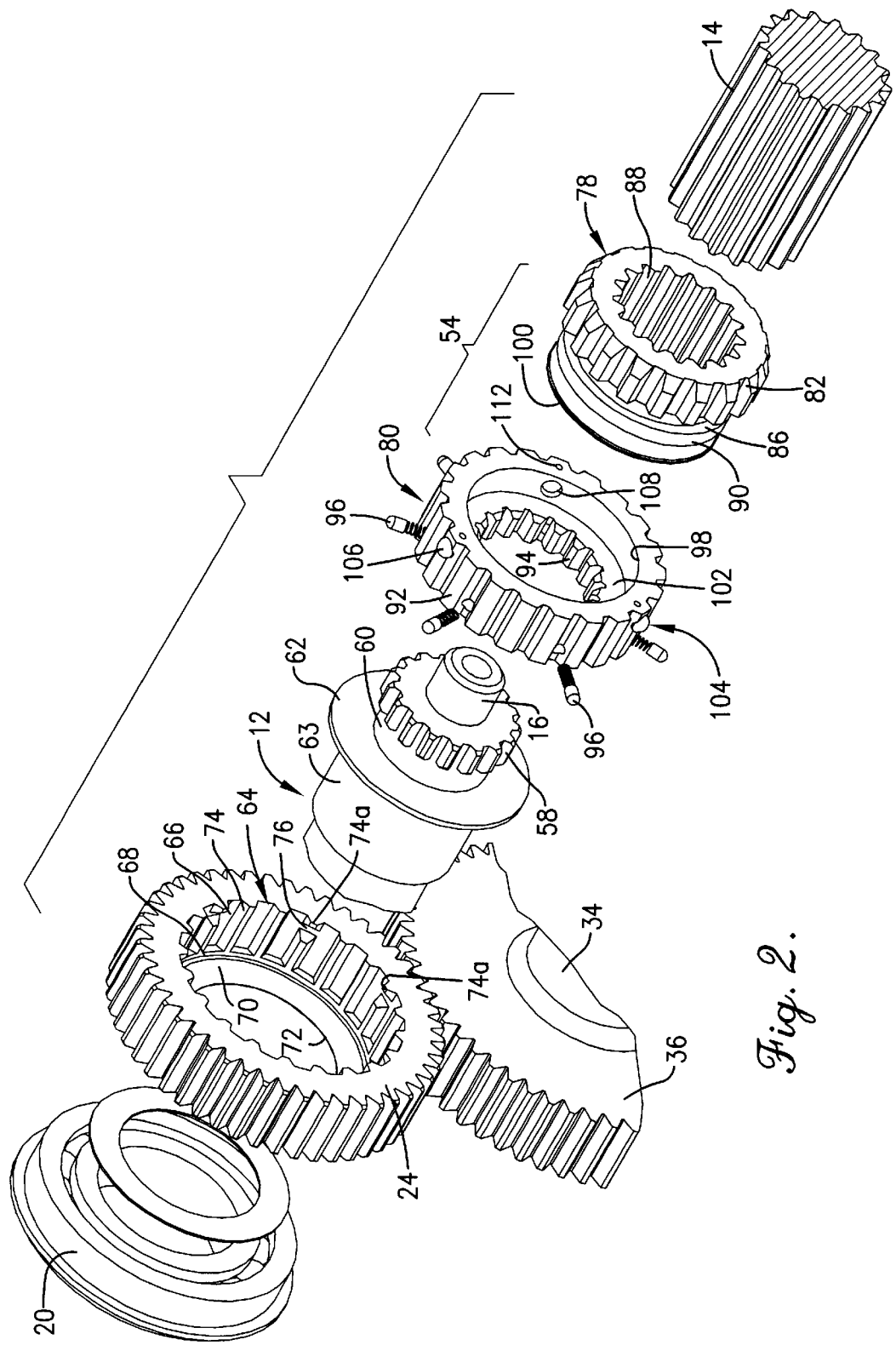
FIG. 2 is an enlarged, fragmentary exploded perspective view of portions of the transmission illustrating in particular components along the input and output shafts of the transmission.

FIG. 1 shows a three speed transmission constructed in accordance with the principles of the present invention, although it will be understood that the present invention is useful with gearboxes having as few as two speeds as well as gearboxes having five speeds or more, synchromesh and non-synchromesh. A shaft assembly 10 includes an input shaft 12 and an output shaft 14 supported in end-to-end axial alignment with one another and adapted for rotation relative to one another except when the gearbox is in a direct drive mode. As illustrated best in FIGS. 3, 4 and 5, the rear end of input shaft 12 has an axially disposed, cylindrical stub 16 that is journaled within a receiving bore 18 in the forward end of output shaft 14 so that shafts 12 and 14 are adapted for rotation relative to one another. As understood by those skilled in the art, suitable means not shown are provided for lubricating the coupling provided between stub 16 and bore 18. A case bearing 20 supported by a front wall 22 (FIGS. 3, 4 and 5) of the gearbox housing rotatably supports input shaft 12, and similar bearing structure (not shown) rotatably supports output shaft 14.

In the illustrated embodiment shaft assembly 10 carries an input gear 24 and three output gears 26, 28 and 30. Generally speaking, input gear 24 and output gears 26, 28 and 30 are all rotatable relative to shaft assembly 10 except when selectively drivingly coupled therewith as hereinafter described. A countershaft assembly 32 is positioned alongside shaft assembly 10 in parallel relation thereto and includes a countershaft 34 that carries a driven or countershaft input gear 36 that is in constant mesh with input gear 24. The driven countershaft gear 36 is fixed to countershaft 34, as are change speed gears 38 and 40 that are in constant mesh with respective output gears 26 and 28. A reverse gear 42 is also fixed to countershaft 34 at the rear end thereof and meshes with a small idler gear 44 that in turn meshes with output gear 30 to provide reverse drive of output shaft 14 when output gear 30 is engaged.

Selector mechanism well known by those skilled in the art includes a pair of shift rods 46 and 48 carrying respective shift forks 50 and 52 slidably thereon. Fork 50 is slidable along rod 46 for shifting between second and third gear (direct drive), while fork 52 is slidable along rod 48 for selecting between reverse gear and first gear. Shift fork 50 is operably coupled with a special slider assembly 54 in accordance with the present invention, while fork 52 is operably coupled with a conventional slider 56. In accordance with known technology, when fork 52 shifts slider 56 forwardly into meshing engagement with output gear 28, the gearbox is placed in first gear as gear 28 becomes operably coupled with output shaft 14 via slider 56 which is splined or otherwise adapted for rotation with output shaft 14. On the other hand when slider 56 is shifted rearwardly into meshing engagement with output gear 30, output gear 30 becomes operably coupled with output shaft 14 to rotate the latter in a direction opposite to the forward mode achieved in first, second and third gears. A neutral position for slider 56 is midway between the two output gears 28 and 30 wherein neither of such output gears is operably coupled with output shaft 14. Likewise, when slider assembly 54 is shifted to its full rear position, output gear 26 becomes operably coupled with output shaft 14 to place the gearbox in second gear, while when slider 54 is shifted to its forwardmost position by fork 50, the transmission is placed in its third gear which is a direct drive mode wherein input shaft 12 and output shaft 14 are directly drivingly interconnected with one another by slider assembly 54.

FIGS. 2–5 focus primarily upon the special slider assembly 54 and its relationship with adjacent components of the gearbox. As illustrated in those figures, input shaft 12 has a set of external teeth 58 located a short distance inboard from the rear end of stub 16 on an enlarged portion of shaft 12 relative to stub 16. Immediately inboard of external teeth 58 is an annular void 60 of reduced diameter relative to teeth 58. Immediately inboard of void 60 is a circular flange 62 having a larger diameter than toothed portion 58. The next inboard region of shaft 12 comprises another reduced diameter portion 63 of slightly larger diameter than void 60, such portion 63 being received within the bearing 20.

Input gear 24 is received on input shaft 12 in concentric relationship therewith. Input gear 24 is hollow, presenting an enlarged open area or socket 64 in the rear face thereof that has an annular sidewall 66 parallel to the longitudinal axis of input shaft 12 and an annular floor or ledge 68 at the innermost end of sidewall 66. From ledge 68, an inclined wall 70 tapers down to a bore 72 sized to fit on input shaft 12 immediately in front of flange 62 for bearing against such flange. The interface between wall 70 and flange 62 is such that input shaft 12 can rotate relative to input gear 24 when the gearbox transmission is in the direct drive mode.

The interior sidewall 66 of socket 64 is provided with a series of interior teeth 74 leading from ledge 68 rearwardly to the rear face of input gear 24. Teeth 74 are spaced circumferentially around sidewall 66 and extend in the axial direction. At a number of spaced locations (preferably 6–8) on the socket sidewall 66, the teeth 74 are interrupted generally adjacent the rear face of the input gear to present a notch 76 that in turn causes the rearmost portion 74a of the tooth 74 to serve as a limit stop as hereinafter described in more detail. Each notch 76 has beveled front and rear entry surfaces.

Figure 5:
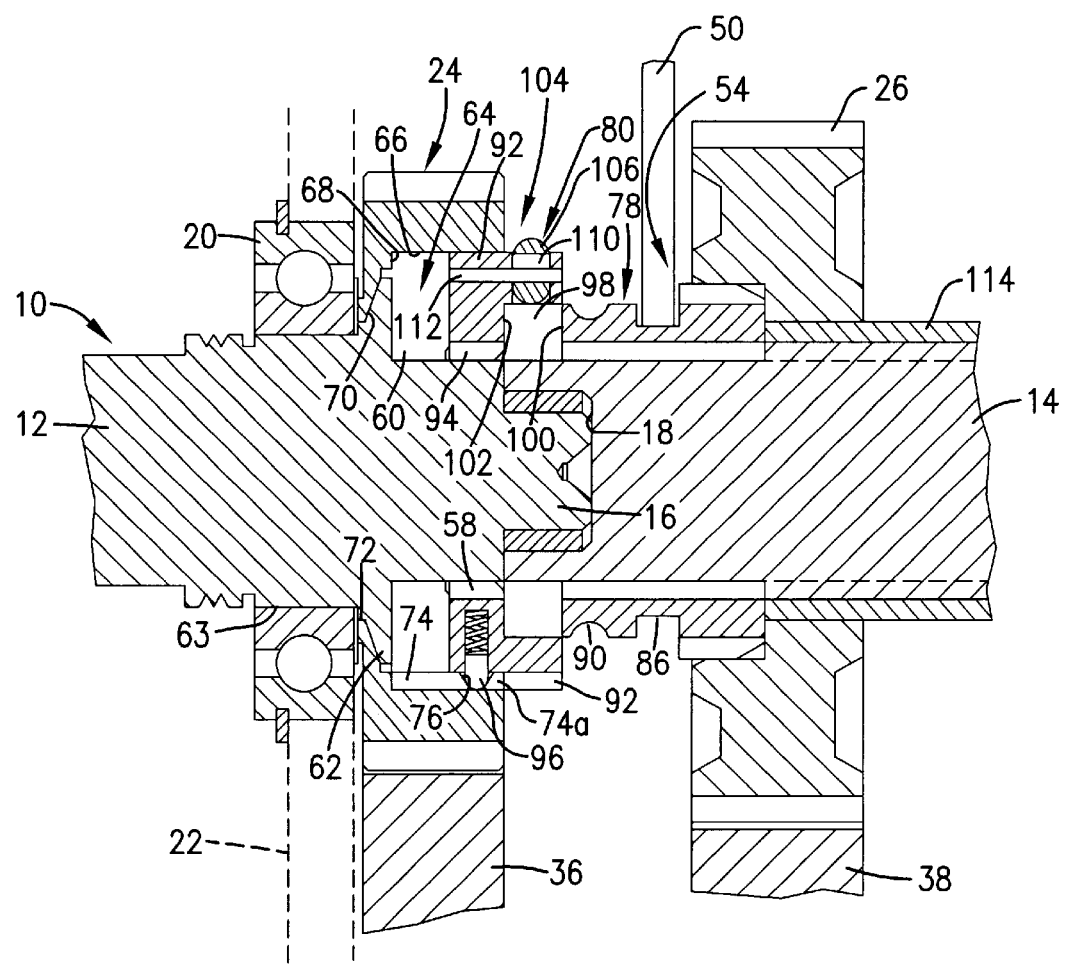
FIG. 5 is a fragmentary cross-sectional view similar to FIGS. 3 and 4 with the apparatus in a change speed mode.

The slider assembly 54 has two primary parts, i.e, a slider sleeve 78 and a slider collar 80 that circumscribes the front end of sleeve 78. Slider sleeve 78 has internal splines 88 that mate with the splined exterior of output shaft 14 so that sleeve 78 is fixed to output shaft 14 for rotation therewith but can move axially therealong. A set of beveled teeth 82 on the exterior of sleeve 78 at its rear end are adapted to mesh with an interior set of beveled teeth 84 on output gear 26 when slider assembly 54 is in its change speed position (FIG. 5). A circumferential groove 86 about the exterior of slider sleeve 78 forward of teeth 82 is adapted to receive shifter fork 50 to facilitate axial displacement of slider sleeve 78. The internal splines 88 of slider sleeve 78 are adapted to matingly engage teeth 58 on input shaft 12 when slider assembly 54 is in the direct drive position of FIG. 3. An annular groove or raceway 90 circumscribes slider sleeve 78 generally adjacent its forward end.

Figure 3:
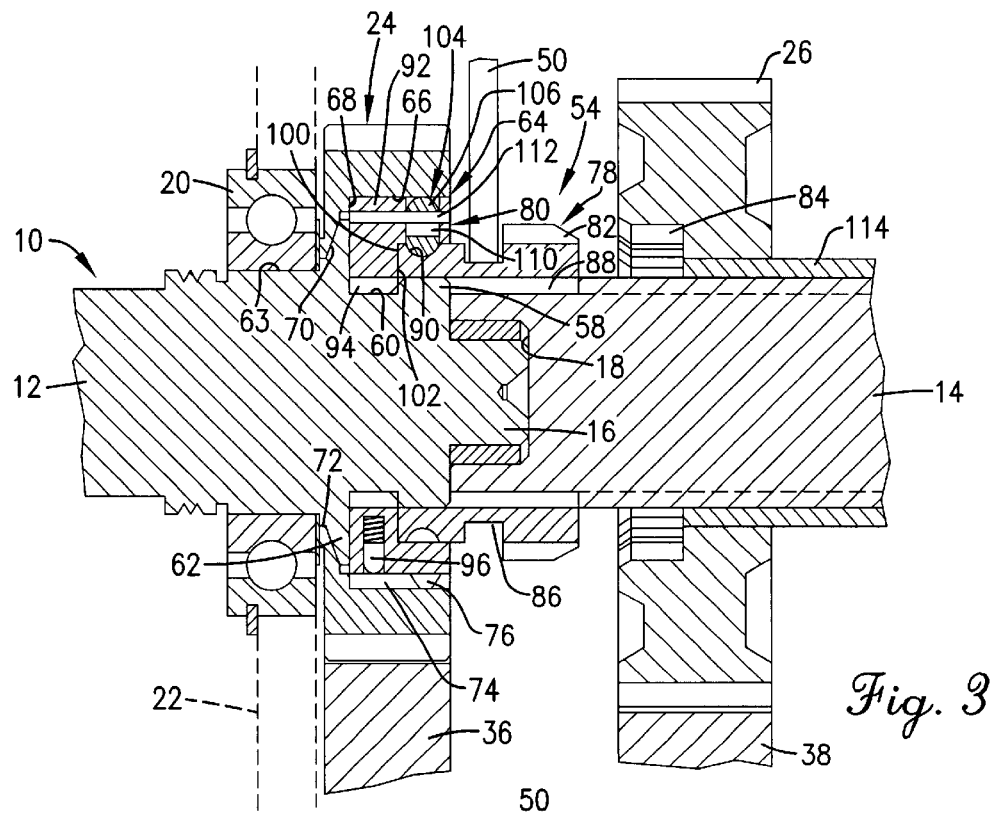
FIG. 3 is a fragmentary cross-sectional view through the transmission showing the apparatus in a direct drive mode.

The slider collar 80 is adapted to be telescopically received within socket 64 of the hollow input gear 24. The width of slider collar 80 in the axial direction is such that when collar 80 is fully received within socket 64 as illustrated in FIG. 3, no portion of collar 80 projects outwardly beyond the rear face of input gear 24. Thus, when slider assembly 54 is in its direct drive position of FIG. 3, slider collar 80 takes up no more room along shaft assembly 10 than input gear 24. On the other hand, slider collar 80 is adapted to be projected partially out of the rear face of input gear 24 such as when slider assembly 54 is in a neutral position of FIG. 4 or a change speed position of FIG. 5. Slider collar 80 never completely leaves socket 64 in any of its operating modes.

A series of external teeth 92 on slider collar 80 are adapted to mesh with interior teeth 74 on input gear 24 at all times. Thus, slider collar 80 and input gear 24 are in constant driving relationship with one another, although the spline-like nature of teeth 92 and 74 permit axial displacement of slider collar 80 relative to input gear 24. An interior set of teeth 94 on slider collar 80 are positioned to be non-drivingly received within void 60 when slider 54 is in the direct drive position of FIG. 3 so that, in such position, input shaft 12 can rotate relative to slider collar 80, and thus also input gear 24. Consequently, input gear 24 is effectively decoupled from input shaft 12 when slider assembly 54 is in the direct drive mode of FIG. 3.

Figure 4:
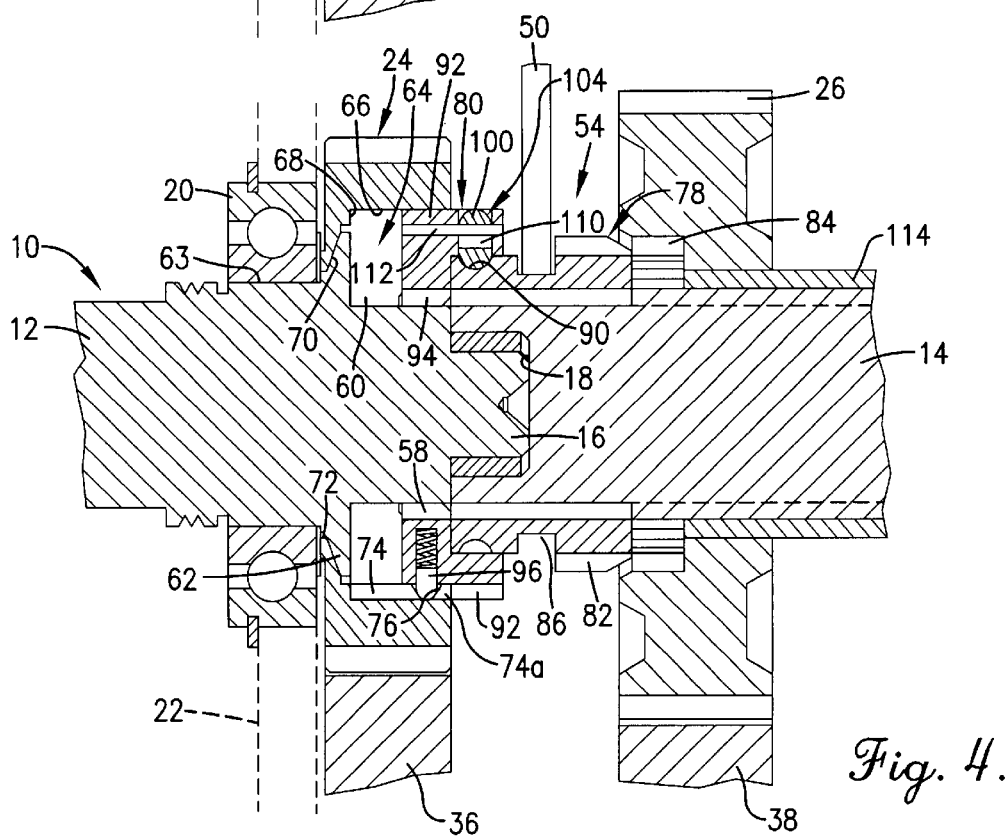
FIG. 4 is a fragmentary cross-sectional view similar to FIG. 3 but showing the apparatus in a neutral position.

However, interior teeth 94 of slider collar 80 are adapted to matingly engage exterior teeth 58 of input shaft 12 when slider collar 80 telescopically is extended from input gear 24 as illustrated in FIGS. 4 and 5. To keep slider collar 80 from completely separating from input gear 24, slider collar 80 is provided with a plurality of spring-loaded, radially projecting dog members 96 corresponding in number to the notches 76 in internal teeth 74 of input gear 24. Dogs 96 are adapted to ride on and bear slidingly against the corresponding internal teeth 74 when collar 80 is in its retracted position of FIG. 3 but to snap out into notches 76 as illustrated in FIGS. 4 and 5 when collar 80 is in its extended position. With dogs 96 so received within notches 76, the remaining portions 74a of the notched teeth 74 serve as limit stops bearing against dogs 96 to prevent further outward telescoping of slider collar 80 from socket 64.

Slider collar 80 has an axially disposed recess 98 in its rear face having an inner diameter only slightly larger than the outer diameter of the forward end of slider sleeve 78. The forward end of slider sleeve 78 thus can be received within recess 98 and, when so received, the forwardmost end edge 100 of slider sleeve 78 abuts against a recessed, annular floor 102 within collar 80. Collar 80 is thus rotatable on sleeve 78, and suitable detent structure broadly denoted by the numeral 104 releasably retains collar 80 and sleeve 78 in their intercoupled relationship. Such detent structure may take a variety of different forms, but in the illustrated embodiment it is in the nature of a plurality of generally cylindrical detents 106 received within and slightly longer than radial receiving holes 108 for the detents in the sidewall of recess 98 at three or more circumferentially spaced locations.

Opposite ends of each detent 106 are rounded, with the inner ends being adapted to matingly fit into raceway 90 of slider sleeve 78. Each detent 106 has an elongated, radially extending slot 110 therein that is oversized with respect to a transverse retaining pin 112 so that the detent is free to move radially inwardly and outwardly to the extent permitted by retaining pin 112 working within slot 110. Although detents 106 retain slider sleeve 78 intercoupled with slider collar 80 when slider 54 is in its direct drive mode of FIG. 3 and the neutral position of FIG. 4, detents 106 are also free to release sleeve 78 from collar 80 upon the application of sufficient rearward force to sleeve 78 by shift fork 50. The radiused inner end of each detent 106 facilitates detents 106 being forced outwardly in a camming action as the forward edge of raceway 90 bears against such curved surfaces. Thus, slider sleeve 78 can assume a separated condition as illustrated in FIG. 5, the detents 106 being cleared by the interior sidewall of recess 98 at such time so as to pop out as shown in FIG. 5. At all other times, detents 106 merely ride in raceway 90 and adapt sleeve 78 and collar 80 for rotation relative to one another.

Operation

When slider assembly 54 is in its direct drive position of FIG. 3, input gear 24 is effectively decoupled from input shaft 12, and thus countershaft assembly 32 is likewise decoupled from input shaft 12. In this condition, as input shaft 12 rotates, it has no driving connection with slider collar 80 which has its internal teeth 94 received within void 60 of input shaft 12 at this time. Thus, although slider collar 80 remains in meshing engagement with input gear 24 through exterior teeth 92 and interior teeth 74 at this time, no power is transferred to input gear 24.

Instead, power from input shaft 12 is transferred to slider sleeve 78 via external teeth 58 on input shaft 12 and internal splines 88 on slider sleeve 78. Thus, slider sleeve 78 rotates with input shaft 12, and such rotation is relative to the stationary slider collar 80 as permitted by the detents 106 riding within raceway 90. Since slider sleeve 78 is in constant driving engagement with output shaft 14 through external splines on shaft 14 and the internal splines 88 on sleeve 78, the power from input shaft 12 is transferred directly to output shaft 14 via slider sleeve 78. It will of course be noted that because output gear 26 is rotatable relative to output shaft 14 at all times unless operably coupled thereto by slider assembly 54, there is no rotation of output gear 26 by output shaft 14 at this time. A bushing or bearing 114 between output gear 26 and output shaft 114 permits such relative rotation between those two components.

When the shifter fork 50 moves slider assembly 54 to the neutral position of FIG. 4, slider sleeve 78 and slider collar 80 move as a unit to such position. This is due to the connection afforded by the detents 106 within raceway 90, which detents are kept from moving radially outwardly at this time by the sidewall 66 of socket 64. When slider assembly 54 reaches the neutral position, dogs 96 snap out into notches 76 to retain slider collar 80 against further axial displacement. Interior teeth 94 on collar 80 come into meshing engagement with exterior teeth 58 on input shaft 12 such that driving power is transferred from input shaft 12 to input gear 24 via slider collar 80. Thus, countershaft assembly 32 also receives input power, and output gear 26 is therefore caused to rotate. However, no power is delivered to output shaft 14 because output gear 26 merely rotates freely on output shaft 14 at this time. With slider assembly 54 in its neutral position, slider sleeve 78 is still out of engagement with output gear 26 such that the rotation of output gear 26 is not transferred to output shaft 14.

When slider assembly 54 is shifted to its rearmost change speed position of FIG. 5, input power from input shaft 12 is directed to input gear 24, then through countershaft assembly 32 to output gear 26, and then to output shaft 14 via slider sleeve 78 which is drivingly coupled with output gear 26 at this time. Thus, output shaft 14 becomes driven at the ratio determined by the countershaft change speed gear 38 and output gear 26, in this particular embodiment such ratio comprising second gear. To accomplish this condition, the slider sleeve 78 must separate from slider collar 80 in the axial direction, such separation being permitted by detents 106 which are snapped out to their outwardly projected positions as illustrated in FIG. 5 at this time to disengage from raceway 90. Relative rotation between output shaft 14 and input shaft 12 is permitted by virtue of the fact that stub 16 of input shaft 12 is rotatably received within the bore 18 of output shaft 14. It will be noted that it is easier for detents 106 to pop out radially than for dogs 96 to pull out of notches 76. Thus, when slider assembly 54 moves to the change speed position of FIG. 5, it is the slider sleeve 78 that separates from collar 80 not, collar 80 from input gear 24.

In order to place the gearbox transmission back into its neutral mode in which slider assembly 54 is in it neutral position of FIG. 4, fork 50 is shifted forwardly from its FIG. 5 position until the front end of slider sleeve 78 becomes received within recess 98 of slider collar 80 and edge 100 butts against floor 102 of collar 80. Detents 106 may or may not reseat within raceway 90 at this time but, in any event, upon further forward shifting of fork 50 toward the direct drive position of FIG. 3, the proximal edges of the rear face of input gear 24 will come to bear against the rounded outer ends of detents 106 and cam them inwardly into raceway 90. In that way, slider sleeve 78 and slider collar 80 will once again become operably coupled together for conjoint axial shifting movement along shaft assembly 10 while permitting relative rotational movement therebetween.

It will thus be seen that the special slider assembly 54 and its telescopic relationship with hollow gear 24 enables countershaft assembly 32 to be decoupled from input shaft 12 in the direct drive mode, but without increasing the overall length of the transmission. Consequently, the substantial energy savings made available by decoupling the countershaft assembly 32 in the direct drive mode can be achieved without requiring an entirely new gearbox housing, and additional actuators. Furthermore, when retro-fitting existing transmissions with the present invention, the original shift fork 50, output gear 26 and output shaft 14 can be utilized, as well as the original countershaft assembly 32 of course, it being only necessary to substitute a new input shaft 12, input gear 24 and slider assembly 54. The total number of parts increases only by one, i.e., the slider collar 80.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In an automotive gearbox, the improvement comprising:

a rotatable shaft assembly including relatively rotatable input and output shafts disposed in end-to-end axial alignment with one another;

an input gear on said input shaft and rotatable relative thereto;

an output gear on said output shaft and rotatable relative thereto; and a slider assembly carried on the shaft assembly between said gears and shiftable axially relative thereto between direct drive and other than direct drive positions, said slider assembly including a pair of relatively rotatable parts, said input gear having a coaxially disposed socket disposed to telescopically receive one of said parts of the slider assembly as the slider assembly shifts between said direct drive and other than direct drive positions, said input gear and said one part of the slider assembly being in continuous operative engagement with one another in both the direct drive and other than direct drive positions of the slider assembly, said input shaft and said one part of the slider assembly being configured to maintain the one part out of operative engagement with the input shaft when the slider assembly is in said direct drive position whereby to decouple the input gear from the input shaft and permit rotation of the input shaft relative to the input gear, said input shaft, said other part of the slider assembly, and said output shaft being so configured that said other part of the slider assembly is disposed in operative interengagement with the input shaft and the output shaft when the slider assembly is in said direct drive position for transferring driving power from the input shaft directly to the output shaft through said other part of the slider assembly, said input shaft and said one part of the slider assembly further being configured to maintain the one part in operative engagement with the input shaft when the slider assembly is in other than said direct drive position whereby to couple the input gear with the input shaft for rotation of the input gear with the input shaft, said input shaft, said other part of the slider assembly, and said output shaft further being so configured that said other part is out of operative engagement with the input shaft when the slider assembly is in other than said direct drive position.

2. In an automotive gearbox as claimed in claim 1, said input gear having an interior set of teeth circumscribing said socket that continuously matingly engage an exterior set of teeth on said one part of the slider assembly.

3. In an automotive gearbox as claimed in claim 1, said input shaft having a set of external teeth disposed to matingly engage a set of interior teeth on said one part of the slider assembly when the slider assembly is in other than said direct drive position, said input shaft further having an annular void located inboard from said set of external teeth and disposed to non-drivingly receive said interior teeth of the one part of the slider assembly when the slider assembly is in said direct drive position to permit rotation of the input shaft relative to said one part of the slider assembly and the input gear.

4. In an automotive gearbox as claimed in claim 1, said one part of the slider assembly including a recess rotatably receiving a proximal end of said other part of the slider assembly, said proximal end of said other part having an external, circumferential raceway that receives radially inwardly projecting detent structure in a wall of the recess of said one part to hold the parts against relative axial displacement when the slider assembly is in said direct drive position but permit relative rotation between said parts.

5. In an automotive gearbox as claimed in claim 4, said detent structure including at least one generally cylindrical detent carried by said one part of the slider assembly for radially inward and outward displacement, said detent having rounded inner and outer ends, said detent having a radially extending, elongated slot and said one part of the slider assembly having a fixed cross pin passing transversely through said slot to limit the extent of inward and outward displacement of the detent.

6. In an automotive gearbox as claimed in claim 4,
said detent structure being retained against release by a wall of the socket of said input gear when the slider assembly is in said direct drive position but being disposed in clearing relationship with said wall when the slider assembly is in other than said direct drive position to permit radially outward movement and release of the detent structure from said raceway of the other part as the other part is displaced axially from the one part, thereby permitting axial separation of the other part from said one part into a speed change position in operative engagement with said output gear,
said output shaft and said other part of the slider assembly being configured to maintain the other part in operative engagement with the output shaft when the other part is in said speed change position.

7. In an automotive gearbox as claimed in claim 6,
said input gear and said one part of the slider assembly having mutually interengageable stop structure disposed to prevent withdrawal of the one part from said socket of the input gear as said other part of the slider assembly is displaced axially from the one part.

8. In an automotive gearbox as claimed in claim 7,
said wall of the socket of the input gear including a set of interior teeth in continuous mating engagement with a set of exterior teeth on said one part of the slider assembly,
said stop structure including a notch in at least one interior tooth on the input gear and a spring-loaded, radially outwardly biased dog on said one part of the slider assembly disposed for yieldable reception into said notch when the slider assembly is in other than said direct drive position,
said dog resisting retraction from said notch to a greater extent than said detent structure resists radially outward movement and release from said raceway of the other part when said other part of the slider assembly is displaced axially from the one part.

9. In an automotive gearbox as claimed in claim 8,
said input shaft having a set of external teeth disposed to matingly engage a set of interior teeth on said one part of the slider assembly when the slider assembly is in other than said direct drive position,
said input shaft further having an annular void located inboard from said set of external teeth and disposed to non-drivingly receive said interior teeth of the one part of the slider assembly when the slider assembly is in said direct drive position to permit rotation of the input shaft relative to said one part of the slider assembly and the input gear.

10. In an automotive gearbox as claimed in claim 1,
said one part being of such width in the axial direction that the one part is entirely received within said socket when the slider assembly is in said direct drive position.

11. An automotive gearbox comprising:
a rotatable shaft assembly including relatively rotatable input and output shafts disposed in end-to-end alignment with one another;
an input gear on said input shaft and rotatable relative thereto;
an output gear on said output shaft and rotatable relative thereto;
a countershaft assembly disposed alongside the shaft assembly and including a driven gear in constant meshing engagement with the input gear and a speed change gear in constant meshing engagement with said output gear; and a slider assembly carried on the shaft assembly between said input and output gears and shiftable axially relative thereto between a direct drive position in which power is transferred directly from the input shaft to the output shaft through the slider assembly while the input gear and countershaft assembly remain decoupled from the input shaft, a neutral position in which the input gear and countershaft assembly remain coupled with the input shaft but the output gear is decoupled from the output shaft, and a change speed position in which power is transferred from the input shaft to the output shaft through the input gear, the countershaft assembly, and the output gear,
said slider assembly including a pair of relatively rotatable parts,
said input gear having a coaxially disposed socket disposed to telescopically receive one of said parts of the slider assembly as the slider assembly shifts between said direct drive, neutral, and change speed positions,
said input gear and said one part of the slider assembly being in continuous operative engagement with one another in all positions of the slider assembly,
said input shaft and said one part of the slider assembly being configured to maintain the one part out of operative engagement with the input shaft when the slider assembly is in said direct drive position whereby to decouple the input gear from the input shaft and permit rotation of the input shaft relative to the input gear,
said input shaft, said other part of the slider assembly, and said output shaft being so configured that said other part of the slider assembly is disposed in operative interengagement with the input shaft and the output shaft when the slider assembly is in said direct drive position for transferring driving power from the input shaft directly to the output shaft through said other part of the slider assembly,
said input shaft and said one part of the slider assembly further being configured to maintain the one part in operative engagement with the input shaft when the slider assembly is in said neutral and change speed positions whereby to couple the input gear with the input shaft for rotation of the input gear with the input shaft,
said input shaft, said other part of the slider assembly, and said output shaft further being so configured that said other part is out of operative engagement with the input shaft when the slider assembly is in said neutral and change speed positions,
said other part being axially separated from said one part and disposed in operative engagement with said output gear and the output shaft when the slider assembly is in said change speed position.

12. An automotive gearbox as claimed in claim 11,
said input gear having an interior set of teeth circumscribing said socket that continuously matingly engage an exterior set of teeth on said one part of the slider assembly.

13. An automotive gearbox as claimed in claim 11,
said input shaft having a set of external teeth disposed to matingly engage a set of interior teeth on said one part of the slider assembly when the slider assembly is in said neutral and change speed positions,
said input shaft further having an annular void located inboard from said set of external teeth and disposed to non-drivingly receive said interior teeth of the one part of the slider assembly when the slider assembly is in said direct drive position to permit rotation of the input shaft relative to said one part of the slider assembly and the input gear.

14. An automotive gearbox as claimed in claim 11, said one part of the slider assembly including a recess rotatably receiving a proximal end of said other part of the slider assembly, said proximal end of said other part having an external, circumferential raceway that receives radially inwardly projecting detent structure in a wall of the recess of said one part to hold the parts against relative axial displacement when the slider assembly is in said direct drive position but permit relative rotation between said parts.

15. An automotive gearbox as claimed in claim 14, said detent structure including at least one generally cylindrical detent carried by said one part of the slider assembly for radially inward and outward displacement, said detent having rounded inner and outer ends, said detent having a radially extending, elongated slot and said one part of the slider assembly having a fixed cross pin passing transversely through said slot to limit the extent of inward and outward displacement of the detent.

16. An automotive gearbox as claimed in claim 14, said detent structure being retained against release by a wall of the socket of said input gear when the slider assembly is in said direct drive position but being disposed in clearing relationship with said wall when the slider assembly is in said neutral and change speed positions to permit radially outward movement and release of the detent structure from said raceway of the other part as the other part is displaced axially from the one part into said change speed position.

17. An automotive gearbox as claimed in claim 16, said input gear and said one part of the slider assembly having mutually interengageable stop structure disposed to prevent withdrawal of the one part from said socket of the input gear as said other part of the slider assembly is displaced axially from the one part.

18. An automotive gearbox as claimed in claim 17, said wall of the socket of the input gear including a set of interior teeth in continuous mating engagement with a set of exterior teeth on said one part of the slider assembly, said stop structure including a notch in at least one interior tooth on the input gear and a spring-loaded, radially outwardly biased dog on said one part of the slider assembly disposed for yieldable reception into said notch when the slider assembly is in said neutral and change speed positions, said dog resisting retraction from said notch to a greater extent than said detent structure resists radially outward movement and release from said raceway of the other part when said other part of the slider assembly is displaced axially from the one part.

19. An automotive gearbox as claimed in claim 18, said input shaft having a set of external teeth disposed to matingly engage a set of interior teeth on said one part of the slider assembly when the slider assembly is in said neutral and change speed positions, said input shaft further having an annular void located inboard from said set of external teeth and disposed to non-drivingly receive said interior teeth of the one part of the slider assembly when the slider assembly is in said direct drive position to permit rotation of the input shaft relative to said one part of the slider assembly and the input gear.

20. An automotive gearbox as claimed in claim 11, said one part being of such width in the axial direction that the one part is entirely received within said socket when the slider assembly is in said direct drive position.

* * * * *